United States Patent [19]

D'Argouges et al.

[11] Patent Number: 4,668,887
[45] Date of Patent: May 26, 1987

[54] SMALL MOTOR STATOR WITH IMPROVED MAGNET MOUNTING

[75] Inventors: Bertrand D'Argouges, Lempdes; Pierre Dumas, Brassac les Mines, both of France

[73] Assignee: Ducelleeier et Cie, Creteil, France

[21] Appl. No.: 719,735

[22] Filed: Apr. 3, 1985

[30] Foreign Application Priority Data

Apr. 5, 1984 [FR] France .................. 84 05353

[51] Int. Cl.⁴ .................................. H02K 21/26
[52] U.S. Cl. .......................... 310/154; 310/42; 310/89; 310/91; 310/218
[58] Field of Search ........... 310/154, 89, 91, 42, 310/40 MM, 254, 259–218, 257

[56] References Cited

U.S. PATENT DOCUMENTS

| 3,258,622 | 6/1966 | Gillespie | 310/218 |
| 3,521,096 | 7/1970 | Merriam | 310/154 |
| 3,631,277 | 12/1971 | Ferdig | 310/154 |
| 3,790,830 | 2/1974 | Bonfiglio | 310/42 |
| 4,071,794 | 1/1978 | Schoen | 310/154 |
| 4,309,815 | 1/1982 | Schmitt | 310/40 MM |

FOREIGN PATENT DOCUMENTS

| 0198829 | 1/1958 | Austria | 310/154 |
| WO82/02288 | 7/1982 | European Pat. Off. | |
| 1923753 | 12/1969 | Fed. Rep. of Germany | 310/154 |
| 1959700 | 6/1971 | Fed. Rep. of Germany | 310/154 |
| 2735778 | 3/1979 | Fed. Rep. of Germany | 310/154 |
| 2072540 | 9/1971 | France | |
| 2323262 | 4/1977 | France | |
| 56-3561 | 1/1981 | Japan | |
| 842524 | 7/1960 | United Kingdom | |

OTHER PUBLICATIONS

Kasufuchi, "Magnet Fixing Means for Small Motor", Patent Abstracts of Japan, vol. 5, No. 51 (E-51) (723), Apr. 10, 1981, JP A 56-3561.

Primary Examiner—Robert Skudy
Attorney, Agent, or Firm—Wenderoth, Lind & Ponack

[57] ABSTRACT

A stator for a small electric motor includes two permanent magnets mounted within a flux circulation frame by a single spring formed of a shaped spring steel rod compressed between the two permanent magnets and urging the two permanent magnets apart and toward respective portions of the frame.

9 Claims, 2 Drawing Figures

U.S. Patent
May 26, 1987
4,668,887
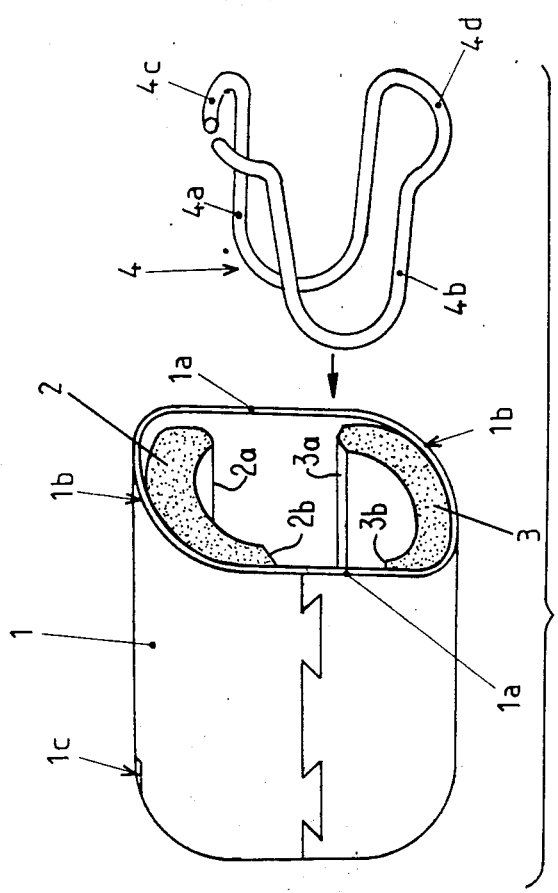

SMALL MOTOR STATOR WITH IMPROVED MAGNET MOUNTING

BACKGROUND OF THE INVENTION

The present invention relates to a stator for small electric motors and of the type including permanent magnets mounted within a flux circulation frame.

To avoid the use of glue for mounting permanent magnets within the frame, and thereby the health problems caused by the constituent elements of the glue, it is common practice in the mass production of such small stators to mount the magnet by mechanical means such as screws, rivets or sheathings formed of synthetic material. However, all such mechanical mounting arrangements result in the stator being very expensive, without ensuring that the magnets are properly fastened at all times. It also is common practice to lock the mountings by a plurality of springs arranged between the magnets. This arrangement however has the disadvantage that the plurality of springs are difficult to install and thus result in a substantial expense.

SUMMARY OF THE INVENTION

With the above discussion in mind, it is the object of the present invention to provide an improved resilient mounting for two permanent magnets within a flux circulation frame, whereby it is possible to overcome the above and other prior art disadvantages.

This object is achieved in accordance with the present invention by the provision of a stator for small electric motors and being of the type including two permanent magnets, a flux circulation frame, and resilient means for mounting the two permanent magnets within the frame, wherein the resilient means comprises a single spring formed of a shaped spring steel wire or rod compressed between the two permanent magnets and urging the two permanent magnets apart and toward respective portions of the flux circulation frame, thereby positively retaining the two magnets in desired positions within the frame.

BRIEF DESCRIPTION OF THE DRAWING

Other objects, features and advantages of the present invention will be apparent from the following detailed description, taken with the accompanying drawing, wherein:

FIG. 1 is an exploded perspective view of an improved stator in accordance with a preferred embodiment of the present invention.

FIG. 2 is a rear view of the stator shown in FIG. 1 prior to the mounting of the spring.

DETAILED DESCRIPTION OF THE INVENTION

As shown in the drawing, the stator of the present invention is of the type which is usable for small electric motors. The stator includes a flux circulation frame 1 which is generally of a cylindrical shape but with two spaced apart parallel flattened portions 1a, the provision of which provides the advantage of reducing the space requirred for the stator. Such flattened portions 1a provide the additional advantage of contributing to the positioning of two permanent magnets 2, 3 each of which have a first longitudinal side edge 2a, 3i a positioned adjacent one of the two spaced apart portions 1a, 1a of the flux circulation frame 1 and a second longitudinal side edge 2b, 3b positioned adjacent the other one of the two spaced apart portions 1a, 1a of the flux circulation frame and which are positioned against and urged toward spaced opposite curved portions 1b of frame 1. The longitudinal positioning of members 2, 3 with respect to frame 1 may be achieved in a conventional manner such as by bearing stops (not shown) and inwardly bent lugs 1c of the frame.

In accordance with the present invention, the magnets 2, 3 are mounted and retained within frame 1 by a novel spring 4 formed of a shaped spring steel wire or rod compressed between permanent magnets 2, 3 and urging such magnets apart and toward respective portions 1b of frame 1. The spring 4 has a pair of portions 4a, 4b, one of the U-shaped, spaced-apart portions contacting the first longitudinal side edge 2a, 3a of each of the two permanent magnets 2, 3 and the other of the U-shaped, spaced apart portions contacting the second longitudinal side edge 2b, 3b of the two permanent magnets 2, 3.

The spring 4 formed of a shaped spring steel wire or rod includes two parallel U-shaped, spaced apart portions 4a, 4b which are spaced apart by a distance at least equal to the width of the permanent magnets 2, 3 such that each of the portions contact both of the two permanent magnets for urging the magnets against the frame. Each U-shaped portion includes first and second substantially straight legs which are joined at first ends thereof (the left ends as shown in the drawing) by a bent or curved portion and diverge toward second ends thereof (the right ends as shown in the drawing). The lower second ends of first legs of both U-shaped portions 4a, 4b are connected together by a first outwardly bent portion 4d which is cambered or inclined outwardly and are substantially perpendicular to the planes containing U-shaped portions 4a, 4b. Second outwardly bent portions 4c are cambered or inclined outwardly toward each other and are substantially perpendicular to the planes containing U-shaped portions 4a, 4b. second outwardly bent portions 4c extend toward each other, but are not joined and form free ends of the shaped spring steel wire or rod. Outwardly bent portions 4d, 4c are substantially in a plane perpendicular to the planes containing U-shaped portions 4a, 4b and are inclined arcuately away from the interiors of the two U-shaped portions 4a, 4b.

The spring 4 is positioned within frame 1 with the substantially straight legs of each U-shaped portion 4a and 4b compressed toward each other between respective longitudinal sides of the two permanent magnets 2, 3. In such position, first outwardly bent portion 4d abuts a curved transverse end of permanent magnet 3, and the second outwardly bent portions 4c abut a curved transverse end of permanent magnet 2. The outwardly bent portions 4d, 4c have configurations substantially complementary to the internal configuration of the curved portions 1b of frame 1.

The use of the spring 4 according to the present invention results in a saving of time during assembly of the stator. Thus, magnets 2, 3, may be positioned within frame 1 and adjacent respective portions 1b thereof, and further with each magnet bearing against an inwardly bent lug 1c of the frame. Outwardly bent portions 4d, 4c are pressed toward each other, thereby bringing the diverging legs of each of the U-shaped portions 4a, 4b toward each other. The thus deformed spring then simply is inserted into the frame between the two magnets until the outwardly bent portions 4d, 4c abut against the curved transverse free ends of respective magnets 3, 2. The pressure urging the outwardly bent portions 4d, 4c toward each other then is relieved, at which time the spring action of the spring will cause the legs of the two U-shaped members 4a, 4b to diverge from each other and into abutment with respective longitudinal side edges of the magnets 2, 3, thereby urging the magnets against internal surfaces of the frame 1. By this arrangement, the magnets are firmly retained in position within the frame without the need for use of glue or the expensive and complicated mechanical structures of the prior art.

Alternatively, the stator may be assembled by positioning magnets 2, 3 against respective legs of the two U-shaped portions 4a, 4b and with the free end surfaces of the magnets abutting respective outwardly bent portions 4d, 4c. This assembly then simply may be inserted longitudinally into the frame 1, whereby such insertion will cause the magnets to compress the legs of the two U-shaped portions toward each other.

It is to be understood that except as described above regarding the novel features of the present invention the various elements and materials thereof of the stator are intended to be conventional, as would be understood by those skilled in the art. Furthermore, it is to be understood that the diameter of the spring steel wire or rod forming the spring 4 will be chosen, as would be understood by those skilled in the art, according to the amount of vibration to which the stator will be subjected.

Although the present invention has been described and illustrated with respect to a preferred embodiment thereof, various changes and modifications to the specifically described structure may be made without departing from the scope of the present invention.

We claim:

1. In a stator for small electric motors, said stator being of the type including two permanent magnets, a flux circulation frame having two spaced-apart portions, and resilient means for mounting said two permanent magnets within said flux circulation frame, each of said two permanent magnets having a first longitudinal side edge positioned adjacent one of said two spaced-apart portions of said flux circulation frame and each of said two permanent magnets having a second longitudinal side edge positioned adjacent the other one of said two spaced-apart portions of said flux circulation frame, the improvement wherein said resilient means comprises:

a single spring formed of a shaped spring steel rod compressed between said two permanent magnets and, said single spring having a pair of U-shaped, spaced apart portions, one of said U-shaped, spaced-apart portions containing said first longitudinal side edge of each of said two permanent magnets and the other of said U-shaped, spaced-apart portions contacting the second longitudinal side edge of each of said two permanent magnets for urging opposite sides of each of said two permanent magnets apart and toward respective portions of said flux circulation frame.

2. In a stator for small electric motors, said stator being of the type including two permanent magnets, a flux circulation frame, and resilient means for mounting said two permanent magnets within said flux circulation frame, the improvement wherein said resilient means comprises:

a single spring formed of a shaped spring steel rod compressed between said two permanent magnets and, said single spring having portions urging opposite sides of each of said two permanent magnets apart and toward respective portions of said flux circulation frame, said spring including two parallel U-shaped portions spaced by a distance at least equal to the width of said two permanent magnets, each said U-shaped portion including first and second legs joined at first ends thereof by a bent portion and diverging toward second ends thereof, a first outwardly bent portion cambered outwardly from said second ends of adjacent said first legs of said two U-shaped portions, said first outwardly bent portion connecting said two U-shaped portions, and second outwardly bent portions cambered outwardly from said second ends of adjacent said second legs of said two U-shaped portions, said second outwardly bent portions extending toward each other.

3. The improvement claimed in claim 2, wherein said second outwardly bent portions are not joined and form free ends of said shaped spring steel rod.

4. The improvement claimed in claim 2, wherein said spring is positioned within said frame with said legs of each said U-shaped portion compressed toward each other between said two permanent magnets, with said first outwardly bent portion abutting an end of a first said magnet, and with said second outwardly bent portions abutting and end of a second said magnet.

5. The improvement claimed in claim 4, wherein said first and second outwardly bent portions have configurations substantially complementary to the internal configuration of said respective portions of said frame.

6. In a stator for small electric motors, said stator being of the type including two permanent magnets, a flux circulation frame, and resilient means for mounting said two permanent magnets within said flux circulation frame, the improvement wherein said resilient means comprises:

a single spring formed of a shaped spring steel rod compressed between said two permanent magnets and urging said two permanent magnets apart and toward respective portions of said flux circulation frame, said spring including two parallel U-shaped portions spaced by a distance at least equal to the width of said two permanent magnets, each said U-shaped portion including first and second legs joined at first ends thereof by a curved portion, said first and second legs diverging toward second ends thereof, a first outwardly bent arcuate portion inclined outwardly away from an interior region defined by each said U-shaped portions, said first outwardly bent arcuate portion connecting said second ends of said first legs of said two U-shaped portions, and second outwardly bent arcuate portions inclined outwardly away from said interior regions defined by said U-shaped portions, said second outwardly bent portions extending toward each other.

7. The improvement claimed in claim 6, wherein said second outwardly bent portions are not joined and form free ends of said shaped spring steel rod.

8. The improvement claimed in claim 6, wherein said spring is positioned within said frame with said legs of each said U-shaped portion compressed toward each other between said two permanent magnets, with said first outwardly bent portion abutting an end of a first said magnet, and with said second outwardly bent portions abutting an end of a second said magnet.

9. The improvement claimed in claim 8, wherein said first and second outwardly bent portions of said spring have configurations substantially complementary to an internal configuration of said respective portions of said frame.

* * * * *